United States Patent [19]

Delavie

[11] 3,922,714

[45] Nov. 25, 1975

[54] DEVICE FOR TRANSMITTING AND REPRODUCING COLOR PICTURES

[75] Inventor: Jean-Henri Delavie, Paris, France

[73] Assignee: Compagnie Industrielle des Telecommunications Cit-Alcatel, France

[22] Filed: Oct. 18, 1973

[21] Appl. No.: 407,655

[30] Foreign Application Priority Data

Oct. 18, 1972 France .............................. 72.36926

[52] U.S. Cl. .............. 358/75; 178/7.6; 178/DIG. 2; 350/96 B; 250/227

[51] Int. Cl. ....... H04n 1/46; H04n 3/00; G02b 5/14

[58] Field of Search ........... 178/DIG. 2, 5.4 ES, 7.6, 178/7.1; 250/233, 236, 226, 227; 358/53, 55, 75, 42, 41; 350/96 B, 96 R

[56] References Cited

UNITED STATES PATENTS 3,112,360 11/1963 Gregg ............................ 178/5.4 ES 3,345,460 10/1967 Betts et al. ...................... 178/DIG. 2

3,394,347 7/1968 Crane ................................ 250/233

*Primary Examiner*—Robert L. Griffin

*Assistant Examiner*—R. John Godfrey

*Attorney, Agent, or Firm*—Craig & Antonelli

[57] ABSTRACT

Device for the transmitting and reproducing of color pictures by the trichromatic method making use of a device which, for analyzing or reproducing a flat document line by line, uses a device for illuminating by a light point describing a circular path, connected with a suitable optical device and comprising synchronizing means for ensuring the required succession of the three colors, for example, blue, green, red, both on transmitting and on receiving.

13 Claims, 4 Drawing Figures

DEVICE FOR TRANSMITTING AND REPRODUCING COLOR PICTURES

The invention comes within the branch of the transmitting and reproducing of color pictures, that is, the transmitting, at one end of a telecommunication link-up and the receiving, at the other end, of signals enabling the reproducing of color pictures. It concerns a device for a transmission according to a trichromatic method making use of a device which, for the analysis or the reproducing of a flat document, line by line, uses a device illuminated by a light spot describing a circular path, combined with a suitable optical means and which comprises synchronizing means for ensuring the required succession of the three colors, for example, blue, green, red, both on transmitting and on receiving.

British Pat. No. 1,157,769 discloses a device for line by line analysis and for the reproducing of a monochromatic picture, which comprises, essentially, a device in the shape of a disc provided at its center with a drive shaft, comprising a dial and an edge forming a hollow rim and a central "hub", that disc being provided with bent optical fibers, which, going from the central hub, widen out radially in the dial in a first curve are bent a second time at the end so as to pass in the rim and a third time so as to lead out onto the inner face of the rim, pointing towards the center.

Such a device, combined with various optical means, such as a lens known as a "large angle lens" and plane mirrors inclined at 45° to the direction of the shaft, producing a transformation of movement of a light spot from a linear to a circular movement and vice versa, enables on the one hand the analysis of a flat document providing, in combination with suitable electrooptical means, electric signals which may be transmitted in a line and, on the other hand, the reproducing of a flat document based on such electrical signals received.

For the reproducing of color pictures by a trichromatic sequential method, the present invention uses the same principle of the linear-to-circular and circular-to-linear transforming of the movement of a light spot.

In the case of trichromatic reproduction, the adapting of that principle comprises the use of three optical fibers, each specialized in one of the three colors (for example, blue, green, red) as well as a means for synchronizing not only speed, this being relatively easy, by known means, but also phase, so as to preserve the correspondence of the colors, for example, "red" signal on transmitting, red color on receiving, etc.

To obtain the necessary synchronizing signal, the invention provides for the use of a fourth optical fiber which leads, not to the inside of the rim, like the three others, but to the thick edge of the wheel (that fourth fiber therefore comprises two curves and not three). Opposite the thick edge side end, a photoelectric sensor provides a synchronizing signal at each rotation of the disc, without disturbing the trichromatic reproduction, as this would be impossible or very complicated, if the fourth fiber had the same shape as the other three.

The invention will be described in detail, with reference to the accompanying drawings, among which:

Figure 1:
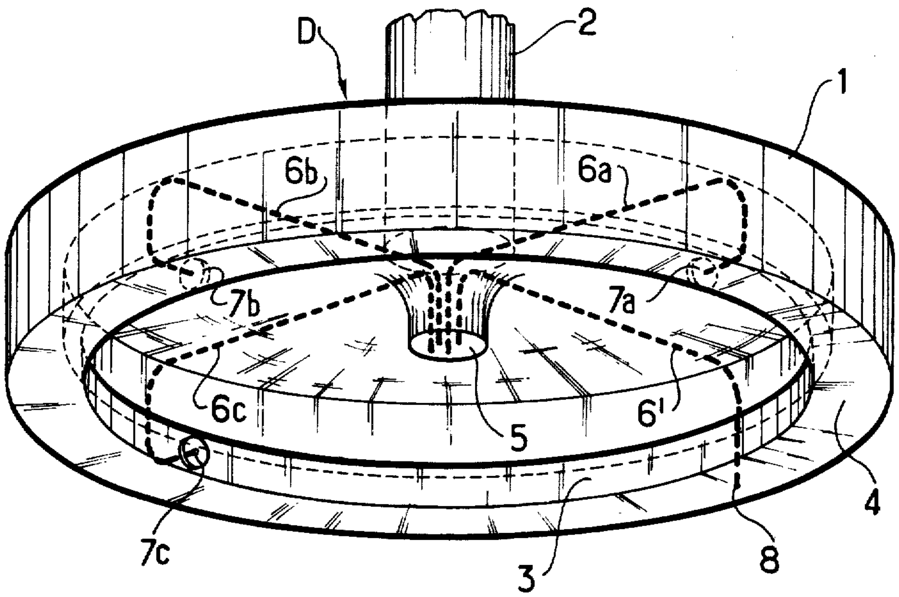
FIG. 1 shows a perspective view, in the known disc-shaped element, the improvement consisting in the adding of an extra optical fiber leading out onto the thick edge and not to the inside of the hollow rim.

In FIG. 1 is a disc D used for constituting a circular trace of light in points comprises a dial 1, fixed to a central shaft 2. That dial 1 is connected up, at the periphery, to a hollow rim 3, ending in a thick edge 4. A central hub 5 receives, on its inside, the parallel segments of four optical fibers which diverge in the dial in four directions at right angles. Three fibers **6*a*, 6*b*, 6*c* end up on the inside face of the rim 3. It has been supposed that the disc provided was intended for transmitting. For that purpose, as will be seen herebelow with reference to FIG. 2, each fiber bears, at its end, a transparent colored pellet 7 forming a monochromatic unit: 7*a* for red, 7*b* for green, 7*c* for blue. In the case of receiving, these colored pellets do not exist, as will be seen with reference to FIG. 3**.

The corresponding fibers **6*a*, 6*b*, 6*c* are hence formed. The fourth fiber 6' has its output point at 8 on the thick edge 4 of the rim 3. The use which will be made of the light spot appearing at 8** will be seen in the following figures.

Figure 2:
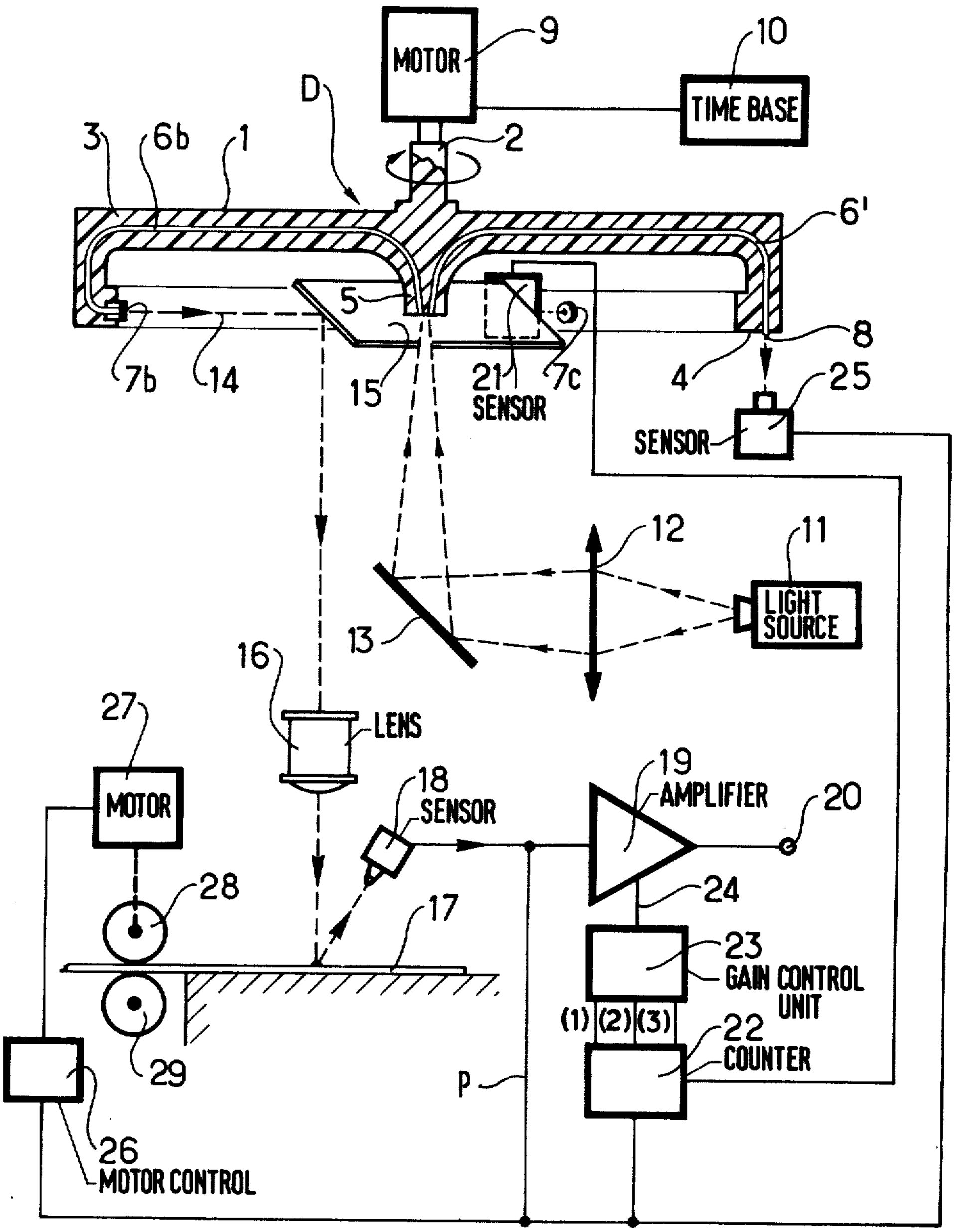
FIG. 2 shows a corresponding optical and electrical transmission diagram.

FIG. 2 shows diagrammatically a sectional view of the disc in FIG. 1; the same references have the same significance as in FIG. 1.

The shaft 2 is connected to an electric motor 9 which is driven at a constant speed under the effect of a time base 10.

Reference numeral 11 is a source of white light, whose light, crossing a capacitor 12, strikes a mirror 13 inclined at 45°, which sends it back towards the ends of the four optical fibers (two of which, **6*b* and 6', are seen) placed in the hub 5**.

The light which comes out of the fiber **6*b*, through the colored pellet 7*b*, in the form of a dimmed colored ray having a radial direction 14, strikes a mirror 15 inclined at 45°, which sends it back towards a lens of the type known as an "uncorrected large angle lens" 16. On rotating, the fiber such as 6*b* produces, on the mirror 15, the virtual image of a path along an arc of a circle, which the lens 16 tranforms into a segment of a straight line. The successive aligned points which form the segment of the resulting straight line are received on a line of a flat document 17 to be reproduced at a distance. The diffused light, whose intensity depends on the color of each line element of the document 17, excites a photoelectric sensor 18**, which is seen end on, which has a length covering at least a complete line of the document. Such photoelectric sensor having an elongated shape are to be found on the market.

The output signal of the sensor 18 is applied to the input of a transmission amplifier 19, whose output is at 20. Reference numeral 21 is a photoelectric sensor receiving the ray 14 sent back by each of the three fibers **6*a*, 6*b*, 6*c*, when it passes perpendicular to the sensor 21 during its rotation. A pulse counter 22 having a capacity of 3 (1-2-3) advances by one unit in circular permutation each time the sensor is excited. The correctness of response from one color to another is ensured by a gain control unit 23 which applies, at 24, a required signal to the amplifier 19**.

Reference numeral 25 is another photoelectric sensor which, placed opposite the thick edge 4 of the disc, is excited by the passing of the output point 8 of the fiber 6'. The sensor 25 has the effect of resetting the counter 22 to 1 if it is not at 1 already. It is used for ensuring the synchronization between the passing of each of the colored fibers 6$a$, 6$b$, 6 $c$ in front of the mirror 15 and the adjusting of the corresponding gain.

At the same time, the sample pulse is applied to the control unit 26 of a step-by-step motor 27 which, by means of a drive roller 28 and a sprocket 29, makes the document 17 advance by the height of a line, for example 0.25 mm.

By a line $p$ the pulses for putting the receiver into phase with the transmitter, coming from the sensor 25, are applied to the input of the amplifier 19.

Figure 3:
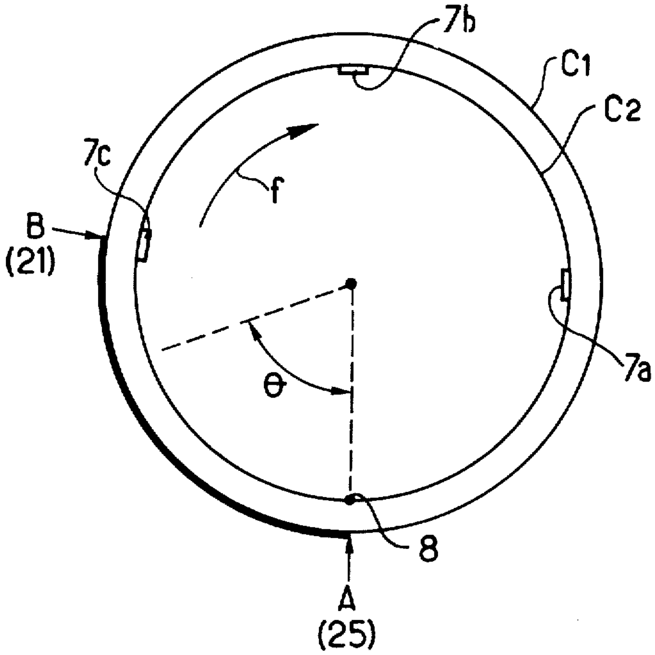
FIG. 3 is a graph assisting in the understanding of the operation of the device.

FIG. 3 comprises two concentric circles C1, C2. The outside circle C1 contains two fixed reference marks: A, position of the sensor 25, B, position of the sensor 21. The quadrant AB drawn in a thick line is the active part of the circular path, corresponding to the illuminating of the whole width of the document.

The inside circle C2 shows the position of the disc D at a given instant, with the outlet points of the fibers 7$a$, 7$b$, 7$c$, 8. The disc rotates in the direction of an arrow $f$.

In the position of the figure, the point 8 has just passed beyond the reference mark A (the counter marks 1). This is the advance period beginning, it covers an arc Θ. When the point 7$a$ passes beyond the reference mark A, the light scanning beings. The adjusting of the gain of the amplifier 19 corresponds to the color of the pellet 7$a$, for example, red. When the pellet 7$a$ passes beyond the reference B, the counter marks 2; the adjusting of the amplifier is effected for the pellet 7$b$, for example, a green pellet. When the pellet 7$b$ passes by the reference mark B, the counter marks 3; the adjusting of the amplifier is effected for the pellet 7$c$, for example, a blue pellet. When the pellet 7$c$ passes by the reference mark B, the counter returns to 1.

If the angle between the point 8 and the point 7$c$ is exactly 90°, the counting pulse 3-1 supplied by the sensor 21 and the pulse for resetting to zero supplied by the sensor 25 are sent out at the same time. It will be an advantage to increase that angle slightly, so that the pulse for resetting to 1 may arrive after the counting pulse 3-1. If the synchronization is correct, the pulse for resetting to 1 only confirms the state 1 of the counter. If the synchronization is not correct, the pulse for resetting to 1 reestablishes the synchronization.

Figure 4:
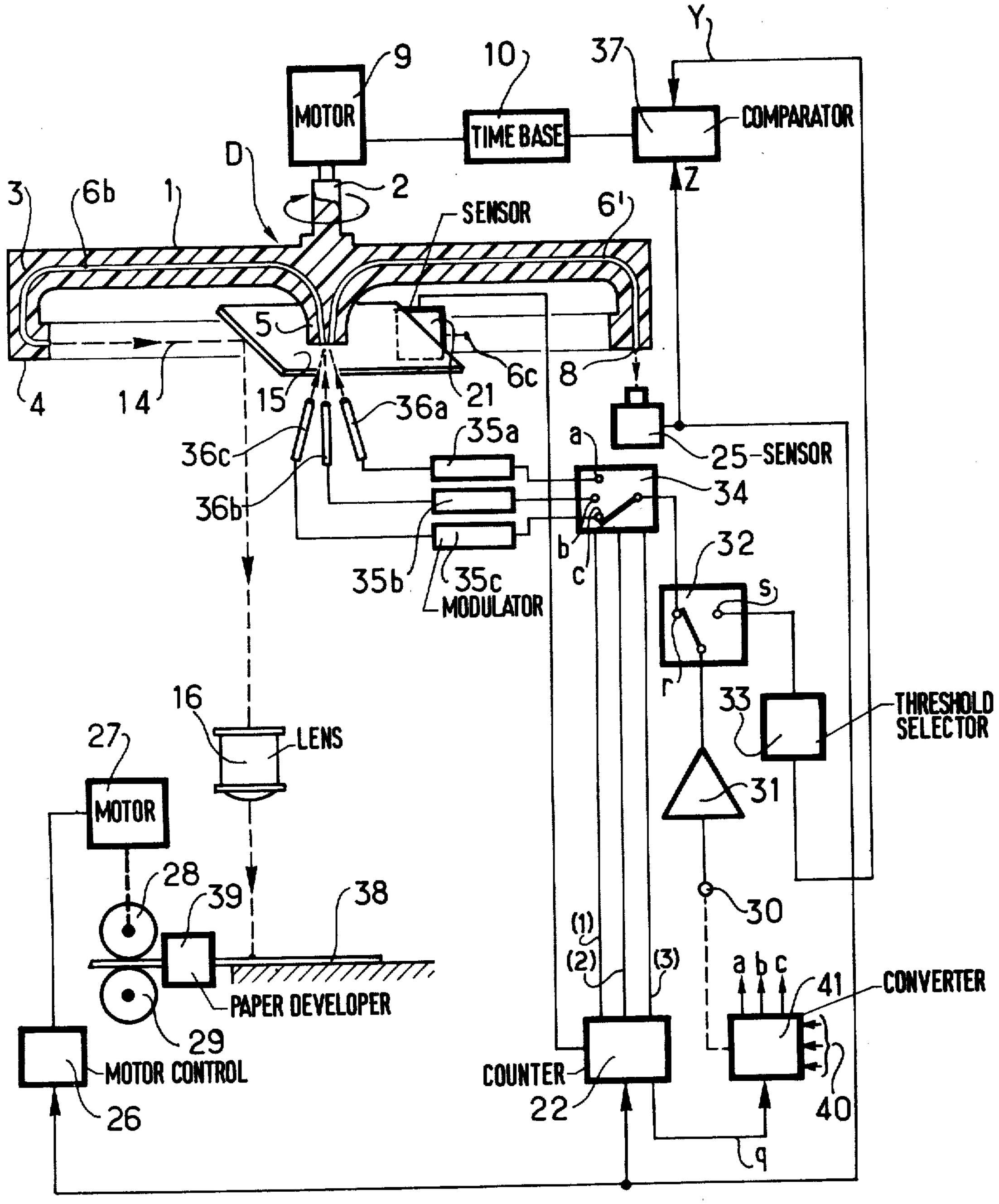
FIG. 4 shows a corresponding optical receiving and electrical diagram.

In FIG. 4 the references common to FIG. 2 have the same significance as in FIG. 2. It will be observed that the end of the optical fiber 6$b$ does not have a colored pellet. The same applies, of course, to the other two fibers 6$a$, 6$c$, not shown in FIG. 4.

A receiving amplifier 31 receives the trichromatic sequential reproducing signals by means of a terminal 30. Reference numeral 32 is an inverter having two positions, position $s$, synchronization, position $r$, reproduction. Reference numeral 33 is a synchronization pulse selector, for example, an amplitude selector, assuming that the said pulse is characterized by an amplitude exceeding a threshold. Reference numeral 34 is a switch having three positions according to the states 1, 2, 3 of the counter 22. These positions are referenced $a$, $b$, $c$, respectively, on the switch 34. Numerals 36$a$, 36$b$, 36$c$ are three color sources, respectively, blue, green, red, for example, energized and modulated by a corresponding modulator 35$a$, 35$b$, 35$c$, selected by the switch 34.

The beam sent out by any of the three sources covers the whole of the surface of the ends of the four optical fibers on the same side as the hub 5.

Light-emitting diodes which may be modulated, emitting green and others emitting red are known.

As a source suitable for modulating blue, a neon-helium laser may be used until light-emitting diodes emitting blue, which are being experimented on, are available.

A color light beam 14 sent back onto the mirror 15, is projected by the large angle lens 16 onto a photosensitive paper 38, for example, of the type known by the trademark "Polaroid". That paper is treated in a suitable known photosensitive element installed at 39.

The switch 34 is controlled by the same pulse counting means as the transmitting, FIG. 2, as in the internal synchronization. Moreover, the time base of the receiver must be synchronized with the time base of the emitter.

In steady state, synchronization is preserved strictly enough for the requirements of the device by the use of a time base timed by a quartz oscillator having a stability of $10^{-6}$, having a frequency equal to the transmission time base. It is sufficient to ensure the phase synchronization. For that purpose, the inverter 32 has, besides the position $r$, reproduction, a position $s$, synchronization. At the beginning of a transmission, the inverter 32 is placed on the position $s$, for a few seconds, to adjust the phase of the normal time base in relation to the transmission time base. Then the inverter 32 reaches the position $r$ to receive the picture signals.

A comparator 37 which receives on the one hand the synchronization pulses Y leaving the selector 33, coming from the emitter (see FIG. 2) and on the other hand, the local synchronization pulses Z generated by the sensor 25, is used for adjusting the phase of the time base in relation to the time base of the transmission by known means, not shown. For example, according to a known arrangement, there is, in the receiver device, a "normal" time base and a "search" time base, which is timed by an oscillator which is a little faster than the normal time base, for example, having a frequency greater by about 2%. In these conditions, a coincidence between a pulse Y and a pulse Z will certainly appear after a few seconds. The normal time base 10 is then set off by automatic means.

If the data is received in parallel (inputs 40), it may either be connected up directly to the terminals $a$, $b$, $c$ of the modulators 35$a$, 35$b$, 35$c$ or be converted into series data by an element 41 connected up to the input 30. There exists a connection $q$ between the counter 19 and the element 41.

What is claimed is:

1. Device for the transmission and reproduction of color pictures by the trichromatic method comprising a rotatable disc having a hub portion and a rim portion, a plurality of optical fibers extending radially in said disc between said hub portion and said rim portion, the end of one of the optical fibers disposed in the rim portion of said disc extending in a direction different from the ends of the other optical fibers disposed in the rim portion, first optical means for applying light to all of the ends of said optical fibers in said hub portion, second optical means for projecting light from the ends of said other optical fibers disposed in said rim portion, first control means for detecting light at the output of said one end of the optical fibers in said rim portion, second control means for detecting successively the light at the ends of said other optical fibers disposed in said rim portion, and third control means responsive to said first and second control means for controlling one of said first and second optical means.

2. Device as defined in claim 1 wherein said first optical means includes a source of white light to be projected on the ends of said optical fibers in said hub portion, and wherein said ends of said other optical fibers disposed in said rim portion are covered with transparent members of different colors.

3. Device as defined in claim 2 wherein said second optical means includes means for projecting the light output of said ends of said other optical fibers onto a document containing data to be transmitted, a first photocell detecting the light reflected from said document and a gain controllable amplifier connected to the output of said first photocell.

4. Device as defined in claim 3 wherein said second control means includes a second photocell receiving light successively from the ends of said other optical fibers, a counter connected to the output of said second photocell, and gain control means responsive to the state of said counter for adjusting the gain of said gain controllable amplifier in steps.

5. Device as defined in claim 4 wherein said first control means includes a third photocell receiving light from said end of said one of said optical fibers in said rim portion, the output of said third photocell being connected to reset said counter.

6. Device as defined in claim 5, further including means for moving said document in stepped increments in response to the output of said third photocell.

7. Device as defined in claim 1 wherein said first optical means includes individual sources of light of different colors and said third control means includes receiver means for receiving respective chromatic signals and selector means for applying the respective chromatic signals sequentially to said respective light sources under control of said second control means.

8. Device as claimed in claim 7 wherein said second optical means includes a lens for projecting the light output of the ends of said other optical fibers in said rim portion on a photosensitive element.

9. Device as defined in claim 7 wherein said second control means includes a first photocell receiving the light output of the ends of said other optical fibers in said rim portion and a counter connected to the output of said first photocell, said selector means comprising a switching device for switching the output of said receiver means to a different source of light in accordance with the state of said counter.

10. Device as defined in claim 9 wherein said first control means includes a second photocell receiving the light from said end of one of said optical fibers in said rim portion, the output of said second photocell being applied to reset said counter.

11. Device as defined in claim 10, further including means for moving said photosensitive element in a stepped manner in response to the output of said second photocell.

12. Device as defined in claim 11, further including drive means for rotating said disc and synchronizing means responsive to the output of said second photocell and said receiver means for initiating operation of said drive means in synchronism with said chromatic signals.

13. A trichromatic scanning device comprising a support disc rotatably mounted on a motor shaft, said disc having a hub portion and a rim portion, four optical fibers mounted in said disc, one end of each of said four optical fibers extending in the axial direction of said disc in said hub portion thereof, each of said four optical fibers extending radially in said disc between said hub portion and said rim portion, each of said fibers being directed inside said rim portion to extend in a direction parallel to said axial direction of said disc, the other ends of three of said four optical fibers being directed from inside said rim portion inwardly toward the axis of said disc while the other end of the fourth optical fiber being directed from inside said rim portion parallel to said axis of said disc, each of said three of said four optical fibers respectively representing one of the three basic colors of the spectrum and said fourth optical fiber being used in synchronization, a mirror rigidly mounted opposite said disc for reflecting sequentially light from said other ends of said three of said four optical fibers to a planar sheet or screen, a light source for applying light simultaneously to said one end of each of said four optical fibers, and a photosensitive element rigidly mounted opposite said rim portion of said disc for receiving light from said other end of said fourth optical fiber when said disc is rotated.

* * * * *